(12) United States Patent
Jang et al.

(10) Patent No.: US 10,701,302 B2
(45) Date of Patent: *Jun. 30, 2020

(54) IMAGE DISPLAY APPARATUS AND OPERATION METHOD THEREOF

(71) Applicant: SAMSUNG ELECTRONICS CO., LTD., Suwon-si, Gyeonggi-do (KR)

(72) Inventors: Jin-hwa Jang, Suwon-si (KR); Kyung-chul Nam, Suwon-si (KR); Ho-shin Son, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/505,250

(22) Filed: Jul. 8, 2019

(65) Prior Publication Data
US 2019/0335134 A1  Oct. 31, 2019

Related U.S. Application Data

(63) Continuation of application No. 15/916,471, filed on Mar. 9, 2018, now Pat. No. 10,348,998.

(30) Foreign Application Priority Data

Mar. 10, 2017 (KR) .................. 10-2017-0030538

(51) Int. Cl.
*H04N 5/50* (2006.01)
*H04N 21/485* (2011.01)
(Continued)

(52) U.S. Cl.
CPC .......... *H04N 5/50* (2013.01); *H04N 21/4345* (2013.01); *H04N 21/4383* (2013.01);
(Continued)

(58) Field of Classification Search
CPC .. H04N 5/50; H04N 21/4345; H04N 21/4383; H04N 21/4384; H04N 21/4432;
(Continued)

(56) References Cited

U.S. PATENT DOCUMENTS 7,549,156 B2   6/2009  Li et al.
8,036,612 B2   10/2011 Kum
(Continued)

FOREIGN PATENT DOCUMENTS

EP    2 466 772       6/2012
JP    2002-084469     6/2009
(Continued)

OTHER PUBLICATIONS

Search Report dated Jun. 27, 2018 in counterpart International Patent Application No. PCT/KR2018/002855.
(Continued)

*Primary Examiner* — Sherrie Hsia
(74) *Attorney, Agent, or Firm* — Nixon & Vanderhye P.C.

(57) ABSTRACT

Provided are an image display apparatus and an operation method thereof. The image display apparatus includes a display, a memory, and a processor configured to execute instructions stored in the memory, the instructions, when executed by the processor, cause the image display apparatus to perform a first channel search comprising searching for one or more channels in which a signal exists as a background operation, while simultaneously performing at least one of initial setting operations of the image display apparatus, to perform a channel search condition setting operation among the initial setting operations to obtain a channel search condition, in response to the channel search condition being obtained through the channel search condition setting operation, to perform a second channel search comprising searching for at least one channel receivable by
(Continued)

the image display apparatus from among the channels obtained by the first channel search, based on the obtained channel search condition, and display a result of the second channel search on the display.

20 Claims, 8 Drawing Sheets

(51) Int. Cl.
*H04N 21/434* (2011.01)
*H04N 21/438* (2011.01)
*H04N 21/443* (2011.01)
*H04N 21/61* (2011.01)

(52) U.S. Cl.
CPC ..... *H04N 21/4384* (2013.01); *H04N 21/4432* (2013.01); *H04N 21/485* (2013.01); *H04N 21/6112* (2013.01); *H04N 21/6118* (2013.01)

(58) Field of Classification Search
CPC ............. H04N 21/485; H04N 21/6112; H04N 21/6118; H04N 5/44
USPC ........ 348/731–733, 725; 725/37, 38, 53, 57, 725/59
See application file for complete search history.

(56) References Cited

U.S. PATENT DOCUMENTS

| 8,102,474 | B2 | 1/2012 | Huang |
| 8,553,158 | B2 | 10/2013 | Ishii |
| 2007/0067803 | A1 | 3/2007 | Mears et al. |
| 2009/0141838 | A1 | 6/2009 | Han et al. |
| 2016/0094865 | A1 | 3/2016 | Lee et al. |
| 2016/0295286 | A1 | 10/2016 | Kang et al. |
| 2017/0150220 | A1 | 5/2017 | Greene |

FOREIGN PATENT DOCUMENTS

| JP | 4798193 | 10/2011 |
| JP | 2013-223064 | 10/2013 |
| KR | 10-0724981 | 6/2007 |
| KR | 10-0752883 | 8/2007 |
| KR | 10-0774202 | 11/2007 |
| KR | 10-1528841 | 6/2015 |

OTHER PUBLICATIONS

Written Opinion dated Jun. 27, 2018 in counterpart International Patent Application No. PCT/KR2018/002855.
Extended Search Report dated Aug. 1, 2019 in counterpart Europe Patent Application No. 18763202.1.

IMAGE DISPLAY APPARATUS AND OPERATION METHOD THEREOF

CROSS-REFERENCE TO RELATED APPLICATION

This application is a continuation of U.S. patent application Ser. No. 15/916,471, filed Mar. 9, 2018 (now U.S. Pat. No. 10,348,998), which is based on and claims priority under 35 U.S.C. § 119 to Korean Patent Application 10-2017-0030538, filed on Mar. 10, 2017, in the Korean Intellectual Property Office, the disclosures of each of which are incorporated by reference herein in their entireties.

BACKGROUND

1. Field

The disclosure relates to an image display apparatus and an operation method thereof, and for example, to an image display apparatus and an operation method thereof, in which a channel search is performed as a background operation.

2. Description of Related Art

Display apparatuses have functions of displaying images for users to watch. Users may watch broadcast content through the display apparatuses. The image display apparatuses display broadcasting selected by the user from broadcast signals transmitted from a broadcasting station, on a display.

Moreover, smart TVs providing various content in addition to a digital broadcasting function have been provided. It is the goal of the smart TV to analyze and provide what a user wants without manipulation of the user, instead of operating passively in response to selection of the user.

Meanwhile, the image display apparatus performs a channel search at the time of an initial setting operation. The channel search refers to searching for and providing a channel that may be received by the image display apparatus among preset frequencies. For the channel search, the user has to wait on a channel search screen until the channel search is completed.

SUMMARY

Various embodiments of the disclosure provide an image display apparatus and an operation method thereof, in which first channel search, which includes extracting valid frequencies at which a signal exists, while performing initial setting operations of the image display apparatus, and second channel search, which includes searching for valid channels that may be received among the valid frequencies, are performed as background operations.

Additional aspects will be set forth in part in the description which follows and, in part, will be apparent from the description.

In accordance with an aspect of the disclosure, an image display apparatus includes a display, a memory storing one or more instructions, and a processor configured to execute the one or more instructions stored in the memory, wherein the processor when executing the one or more instructions causes the image display apparatus to perform a first channel search comprising searching for one or more channels in which a signal exists as a background operation, while simultaneously performing at least one of initial setting operations of the image display apparatus, to perform a channel search condition setting operation among the initial setting operations to obtain a channel search condition, in response to the channel search condition being obtained through the channel search condition setting operation, to perform a second channel search comprising searching for at least one channel receivable by the image display apparatus from among the channels obtained by the first channel search, based on the obtained channel search condition, and to display a result of the second channel search on the display.

In accordance with another aspect of the disclosure, a method of operating an image display apparatus includes performing a first channel search comprising searching for one or more channels in which a signal exists as a background operation, while simultaneously performing at least one of initial setting operations of the image display apparatus, performing a channel search condition setting operation among the initial setting operations to obtain a channel search condition, in response to the channel search condition being obtained through the channel search condition setting operation, performing a second channel search comprising searching for at least one channel receivable by the image display apparatus from among the channels obtained by the first channel search, based on the obtained channel search condition, and displaying a result of the second channel search on the display.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
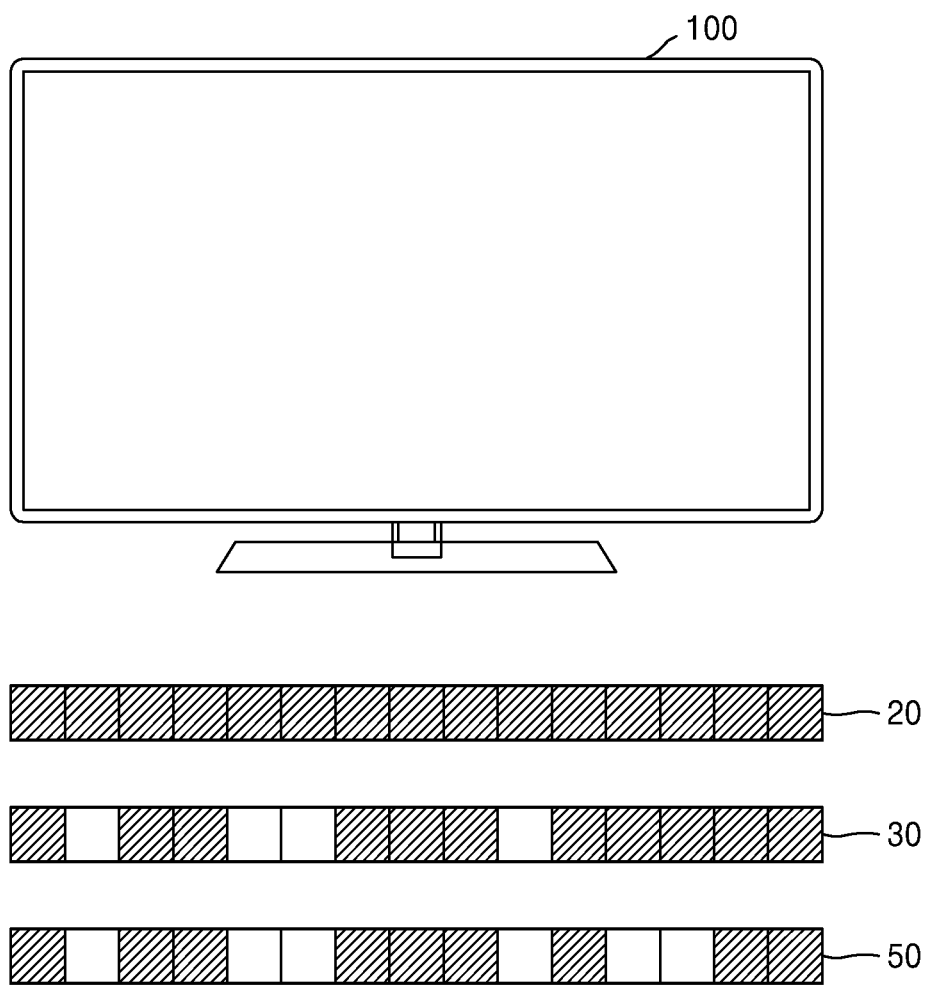
FIG. 1 is a diagram illustrating an example image display apparatus according to an embodiment.

Reference will now be made in greater detail to various example embodiments, examples of which are illustrated in the accompanying drawings, wherein like reference numerals refer to like elements throughout. In this regard, the present embodiments may have different forms and should not be understood as being limited to the descriptions set forth herein. Accordingly, the embodiments are merely described below, by referring to the figures, to explain various example aspects. Expressions such as "at least one of," when preceding a list of elements, modify the entire list of elements and do not modify the individual elements of the list.

Terms used herein will be described in brief, and the present disclosure will be described in detail.

Although terms used in the present disclosure are selected with general terms popularly used at present under the consideration of functions in the present disclosure, the terms may vary according to the intention of those of ordinary skill in the art, judicial precedents, or introduction of new technology. In addition, in a specific case, terms may be arbitrarily selected, and in this case, the meaning of the terms is disclosed in a corresponding description part of the disclosure. Thus, the terms used in the present disclosure should be defined not by the simple names of the terms but by the meaning of the terms and the contents throughout the present disclosure.

Throughout the entirety of the specification of the present disclosure, if it is assumed that a certain part includes a certain component, the term 'including' means that a corresponding component may further include other components unless a specific meaning opposed to the corresponding component is written. The term used in the embodiments such as "unit" or "module" indicates a unit for processing at least one function or operation, and may be implemented in hardware, software, or in any combination of hardware and software.

Hereinafter, embodiments of the present disclosure will be described in greater detail with reference to the attached drawings. However, the present disclosure may be implemented in various forms, and are not limited to the embodiments described herein. To clearly describe the present disclosure, parts that are not associated with the description may be omitted from the drawings, and throughout the disclosure, identical reference numerals refer to identical parts.

FIG. 1 is a diagram illustrating an example image display apparatus 100 according to an embodiment.

As illustrated in FIG. 1, the image display apparatus 100 may, for example, and without limitation, be a television (TV), or the like, which may be only an example embodiment, and may also be implemented with an electronic device capable of displaying an image based on a broadcast signal. For example, the image display apparatus 100 may be implemented, for example, and without limitation, with various electronic devices such as a cellular phone, a tablet personal computer (PC), a digital camera, a camcorder, a laptop computer, a desktop, an electronic (e)-book terminal, a digital broadcasting terminal, a personal digital assistant (PDA), a portable multimedia player (PMP), a navigator, an MP3 player, a wearable device, or the like. In particular, embodiments may be easily implemented in, but not limited to, a display device having a large-size display such as a TV.

The image display apparatus 100 may be of a fixed type or a mobile type and may be a digital broadcasting receiver capable of receiving digital broadcasting. The image display apparatus 100 may be implemented with not only a flat display device, but also a curved display device provided with a screen having a curvature or a flexible display device having an adjustable curvature. An output resolution of the image display apparatus 100 may include, for example, and without limitation, high definition (HD), full HD, ultra HD, or a higher resolution than ultra HD, or the like.

In an embodiment of the present disclosure, the term "user" may refer, for example, to a person who controls a function or an operation of the image display apparatus 100 using the control device, and may include a viewer, a manager, or an installation engineer, or the like, but is not limited thereto.

In the image display apparatus 100 according to an embodiment, region information may be configured, which may be configured in advance or may be configured or changed based on a user input.

The image display apparatus 100 performs a first channel search, which includes extracting frequencies 30 (for example, valid frequencies) at which a signal actually exists from among frequencies 20 available in a corresponding region, based on region information. Each of frequencies according to an embodiment is indicated by a frequency band having a specific bandwidth, and may have a corresponding channel number. Each of rectangular zones included in a list of the frequencies 20 of FIG. 1 indicates a frequency or a channel that is available in a corresponding region. In a list of the frequencies 30 of FIG. 1, hatched zones indicate valid frequencies.

The image display apparatus 100 performs a channel search condition setting operation to obtain a channel search condition.

The image display apparatus 100 also performs a second channel search, which includes searching for channels 50 (for example, valid channels) that may be received by the image display apparatus 100 by scanning the extracted valid frequencies obtained by the first channel search. The valid channels may refer, for example, to channels, broadcast data of which may be received. In a list of the channels 50 of FIG. 1, hatched zones indicate frequencies corresponding to valid channels.

The image display apparatus 100 generates a channel map including the searched valid channels and stores the generated channel map.

The image display apparatus 100 according to an embodiment performs initial setting operations when the image display apparatus 100 operates initially. A process of performing the initial setting operations may be called out of box experience (OOBE), plug & play, set-up, or the like. However, the present disclosure is not limited to this example.

The initial setting operations may include, but are not limited to, at least one of a language setting operation, a region information setting operation, a channel search operation, and a network setting operation, and may be performed in a preset order.

The image display apparatus 100 according to an embodiment may perform the first channel search as a background operation while performing at least one among the initial setting operations. The image display apparatus 100 according to an embodiment may perform a channel search condition setting operation among the initial setting operations to obtain a channel search condition. The image display apparatus 100 according to an embodiment may also perform the second channel search as a background operation based on the channel search condition being obtained through the channel search condition setting operation. The image display apparatus 100 according to an embodiment may perform the second channel search while simultaneously performing remaining initial setting operations other than the at least one among the initial setting operations.

The image display apparatus 100 displays a result of the second channel search upon completion of the initial setting operations. For example, the image display apparatus 100 may display a screen showing the searched valid channels on a display.

Thus, by performing the first channel search and the second channel search simultaneously and in parallel with the initial setting operations, the image display apparatus 100 according to an embodiment may reduce a time needed for completion of the initial setting operations and may perform other initial setting operations without waiting on the channel search screen until completion of the channel search.

Figure 2:
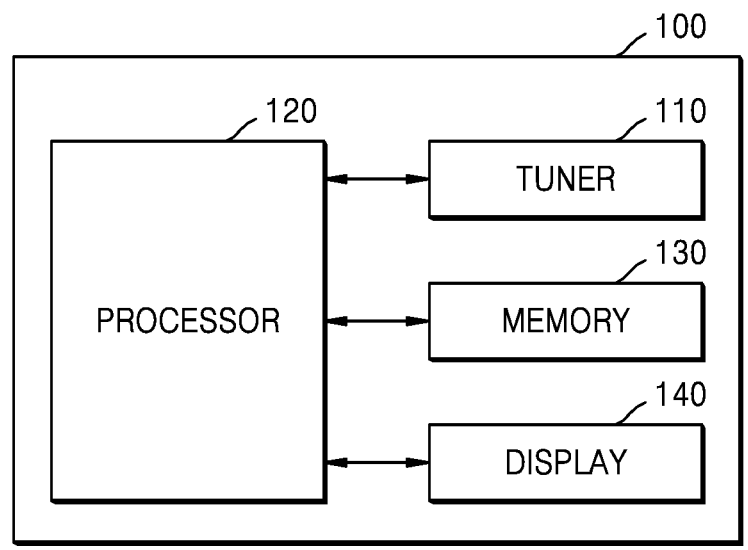
FIG. 2 is a block diagram illustrating an example image display apparatus according to an embodiment.

FIG. 2 is a block diagram illustrating an example image display apparatus according to an embodiment.

Referring to FIG. 2, an image display apparatus 100 according to an embodiment may include a tuner 110, a processor (e.g., including processing circuitry) 120, a memory 130, and a display 140.

The tuner 110 selects a frequency of a channel the image display apparatus 100 desires to receive from among many electric wave components by tuning the frequency through amplification, mixing, resonance, or the like with respect to a broadcast signal received wiredly or wirelessly. The broadcast signal may include audio, video, and additional information (for example, an electronic program guide (EPG)).

The tuner 110 receives a broadcast signal from various sources such as terrestrial broadcasting, cable broadcasting, satellite broadcasting, Internet broadcasting, and so forth. The tuner unit 140 receives a broadcast signal from a source such as analog broadcasting, digital broadcasting, or the like.

The processor 120 according to an embodiment may include various processing circuitry and execute one or more programs stored in the memory 130. The processor 120 may include, for example, and without limitation, a single core, a dual core, a triple core, a quad core, and a core of a multiple thereof. The processor 120 may also include a plurality of processors. For example, the processor 120 may be implemented with a main processor (not shown) and a sub processor (not shown) which operates in a sleep mode.

The memory 130 according to an embodiment stores various data, programs, or applications for driving and controlling the image display apparatus 100. The programs stored in the memory 130 may include one or more instructions. The programs (for example, one or more instructions) or applications stored in the memory 130 may be executed by the processor 120.

The processor 120 according to an embodiment controls the tuner 110 to perform frequency tuning, thus performing the first channel search which includes extracting valid frequencies at which a signal exists among frequencies corresponding to a region where the image display apparatus 100 is located (for example, frequencies available in the region where the image display apparatus 100 is located).

For a digital cable broadcast signal, the processor 120 according to an embodiment extracts the valid frequencies at which a signal exists, by using a received signal strength indication (RSSI) as a reference value. For example, when an RSSI of a frequency corresponding to digital cable broadcasting is greater than a preset threshold value, the processor 120 may extract the frequency of a corresponding broadcast signal as a valid frequency. In this case, a threshold value for an RSSI may vary, but not limited to, with a frequency or a common carrier.

On the other hand, when a frequency for which whether a signal exists is to be determined is not a frequency corresponding to digital cable broadcasting, the image display apparatus 100 determines whether the signal corresponding to the frequency exists through frequency tuning. For example, when a frequency corresponds to any one of analog cable broadcasting, digital terrestrial broadcasting, and analog terrestrial broadcasting, the tuner 110 performs frequency tuning using a particular modulation scheme to determine whether a signal exists.

When existence or absence of a signal is determined using frequency tuning, a modulation scheme as well as a signal strength need to be considered, such that detection of a signal corresponding to a frequency may be more accurate, but may be slower, than with determination using an RSSI.

Moreover, for terrestrial broadcasting, since there may be a large error in determining existence or absence of a radio wave signal present in the air merely by using a strength of the signal due to noise, interference, diffraction, or the like, it may be more proper to determine existence or absence of the signal by using frequency tuning than by using an RSSI. For analog cable broadcasting, there is no large speed difference between the use of frequency tuning and the use of an RSSI, such that the use of frequency tuning, which provides high accuracy, may be suitable. However, the present disclosure is not limited to this example.

Moreover, the processor 120 performs the second channel search which includes searching for frequencies corresponding to channels that may be received (for example, channels capable of receiving a valid broadcast signal) among valid frequencies.

The processor 120 performs the first channel search and the second channel search as background operations, simultaneously with the initial setting operations of the image display apparatus 100. For example, the processor 120 performs the first operations, to be performed prior to the channel search operation, among the initial setting operations, simultaneously with the first channel search, and the second operations, to be performed after the channel search operation, among the initial setting operations, simultaneously with the second channel search.

The display 140 converts an image signal, a data signal, an on-screen display (OSD) signal, a control signal, or the like, processed by the processor 120, to generate a driving signal. The display 140 may be implemented with a plasma display panel (PDP), a liquid crystal display (LCD), an organic light-emitting diode (OLED), a flexible display, or the like, but is not limited thereto, and may also be implemented with a three-dimensional (3D) display. The display 140 may include a touch screen and thus may be used as an input device as well as an output device.

The display 140 according to an embodiment displays a progress state of the second channel search or a result of the second channel search. For example, the display 140 may display a screen indicating a progress state of the second channel search, when the second channel search is not completed in spite of completion of the initial setting operations. The display 140 may display a result of the second channel search when both the initial setting operations and the second channel search are completed.

Figure 3:
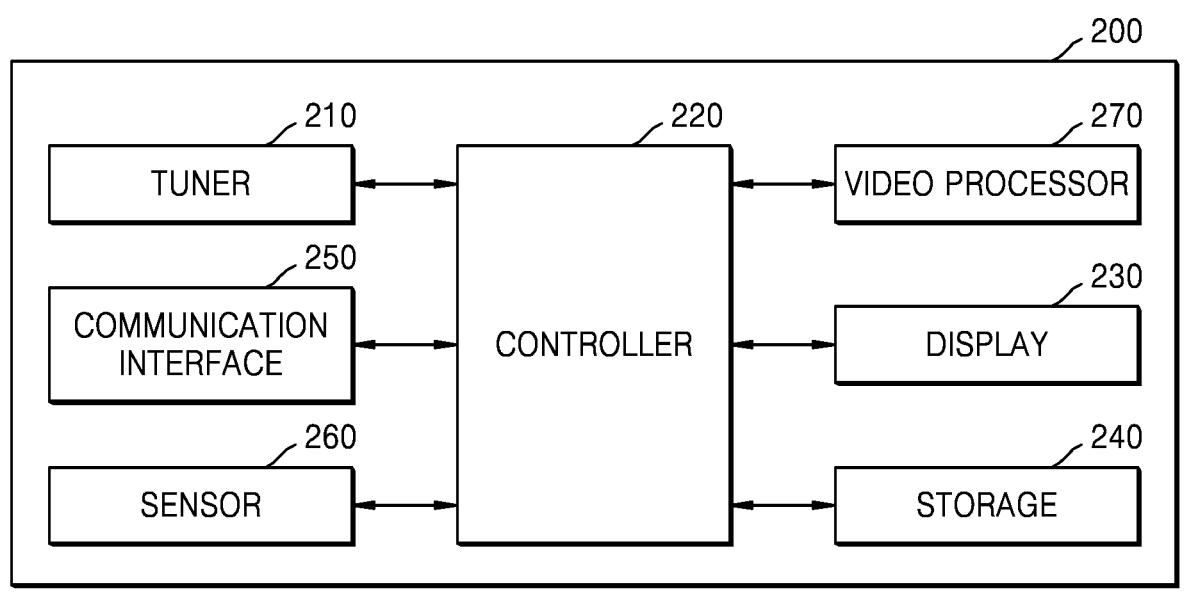
FIG. 3 is a block diagram illustrating an example image display apparatus according to another embodiment.

FIG. 3 is a block diagram illustrating an example image display apparatus according to another embodiment. An image display apparatus 200 illustrated in FIG. 3 may be an embodiment of the image display apparatus 100 illustrated in FIG. 1.

Referring to FIG. 3, an image display apparatus 200 according to an embodiment may include a tuner 210, a controller (e.g., including processing circuitry) 220, a display 230, a storage 240, a communication interface (e.g., including communication circuitry) 250, a sensor 260, and a video processor (e.g., including video processing circuitry) 270.

The tuner 110 of FIG. 2 may correspond to the tuner 210 of FIG. 3, the processor 120 of FIG. 2 may correspond to the controller 220 of FIG. 3, the memory 130 of FIG. 2 may correspond to the storage 240 of FIG. 3, and the display 140 of FIG. 2 may correspond to the display 230 of FIG. 3. The same description as made with reference to FIG. 2 will not be provided with reference to FIG. 3.

The tuner 210 receives a broadcast signal in a frequency band corresponding to a channel number based on a user input (for example, a control signal received from a control device, such as a channel number input, a channel up-down input, and a channel input on an EPG screen).

The communication interface 250 may include various communication circuitry and transmits and receives data or a signal from an external device or a server under control of the controller 220. The controller 220 may include various processing circuitry and transmits/receives contents to/from an external device connected through the communication interface 250, downloads an application from the external device, or browses the web. The communication interface 250 transmits and receives data or a signal by using at least one of a wireless local area network (WLAN) (for example, Wireless Fidelity (Wi-Fi), Bluetooth, wired Ethernet, infrared (IR), Bluetooth Low Energy (BLE), ultrasonic waves, ZigBee, a high definition multimedia interface (HDMI), and HDM I-Consumer Electronics Control (CEC), according to capability and structure of the image display apparatus 200.

The video processor 270 may include various video processing circuitry and processes video data received by the image display apparatus 200. The video processor 270 performs various image processing, such as decoding, scaling, noise filtering, frame rate conversion, resolution conversion, etc., with respect to video data.

The sensor 260 receives a light signal (including a control signal) received from an external control device through a lighting window (not shown) of a bezel of the display 220. The sensor 260 receives a light signal corresponding to a user input (for example, a touch, a press, a touch gesture, a voice, or a motion) from a control device. The controller 210 extracts a control signal from the received light signal. The sensor 260 senses a voice, an image, or an interaction of the user. The sensor 260 according to an embodiment may include a microphone that receives a user's uttered speech. The microphone converts the received speech into an electric signal and outputs the electric signal to the controller 220.

The sensor 260 according to an embodiment senses a user input and delivers a sensed signal to the controller 220. The sensor 260 senses a user input such as channel up/down, power on/off, channel selection, screen settings, or the like from the control device.

The storage 240 stores various data, programs, or applications for driving and controlling the image display apparatus 200 under control of the controller 220. The storage 240 may include a broadcasting reception module, a channel control module, a volume control module, a communication control module, a voice recognition module, a motion recognition module, a light reception module, a display control module, an audio control module, an external input control module, a power control module, a power control module of an external device connected wirelessly (for example, by Bluetooth), a voice database (DB), or a motion DB. Modules and DBs (not shown) of the storage 240 may be implemented in the form of software to perform a control function of broadcasting reception, a channel control function, a volume control function, a communication control function, a voice recognition function, a motion recognition function, a light reception control function, a power control function, or a power control function of an external device connected wirelessly (for example, by Bluetooth) in the image display apparatus 200. The controller 220 may perform respective functions by using the foregoing software stored in the storage 240.

Meanwhile, the block diagrams of the image display apparatuses 100 and 200 shown in FIGS. 2 and 3, respectively, are block diagrams for an example embodiment. Elements of the block diagram may be integrated, added, or omitted depending on the specifications of the image display apparatus 100 and 200 implemented actually. That is, when necessary, two or more elements may be integrated into one element or one element may be divided into two or more elements. A function executed in each element (or module) is intended to describe embodiments, and a detailed operation or apparatus thereof does not limit the scope of the present disclosure.

Figure 4:
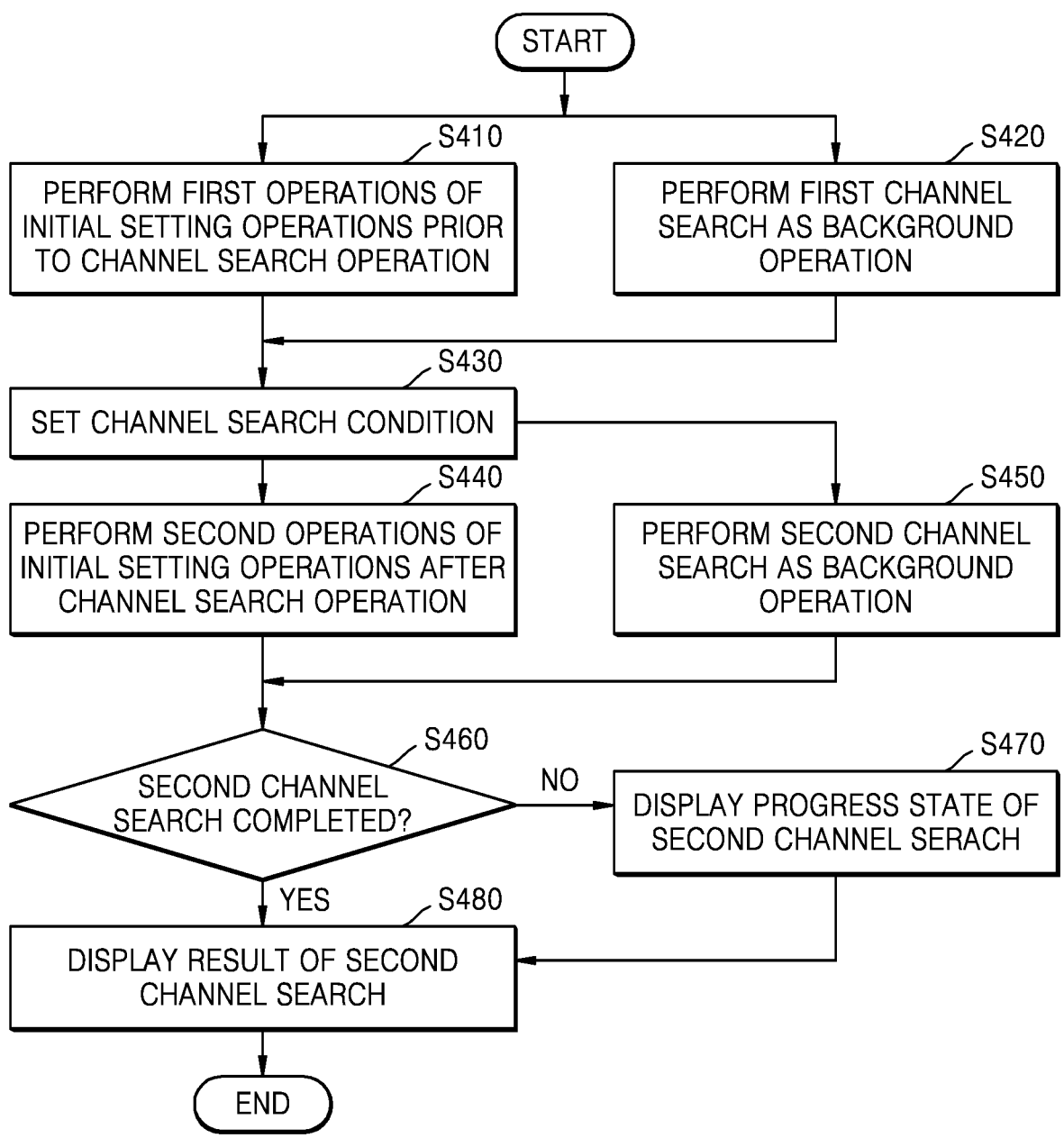
FIG. 4 is a flowchart illustrating an example method of operating an image display apparatus, according to an embodiment.

FIG. 4 is a flowchart illustrating an example method of operating an image display apparatus, according to an embodiment.

Referring to FIG. 4, the image display apparatus 100 according to an embodiment performs operations needed for initial setting of the image display apparatus 100 when the image display apparatus 100 operates initially S410. The initial setting operations may include, but not limited to, at least one of a language setting operation, a region information setting operation, a channel search operation, and a network setting operation, and may be performed in a preset order.

The image display apparatus 100 according to an embodiment performs the initial setting operations in the preset order when initial setting starts. The image display apparatus 100 performs the first channel search for extracting a valid frequency as a background operation in operation S420 in parallel while performing the first operations among the initial setting operations, in operation S410. The first operations are to be performed prior to the channel search operation. For example, the image display apparatus 100 extracts frequencies (valid frequencies) at which a signal actually exists by determining whether a signal corresponding to frequencies available in a region exists based on the region information set in the image display apparatus 100.

When the channel search operation among the initial setting operations starts, the image display apparatus 100 according to an embodiment may terminate the first channel search for all the frequencies available in the region, even when the first channel search is not completed. For example, when the first channel search is performed for only a cable broadcast signal between the cable broadcast signal and a terrestrial broadcast signal when the channel search operation starts, then the image display apparatus 100 may terminate the first channel search without performing the first channel search for the terrestrial broadcast signal.

Once the channel search operation is performed, the image display apparatus 100 according to an embodiment sets a channel search condition in operation S430. The channel search condition may be preset or may be set based on a user input. The channel search operation may include a channel search condition setting operation and the second channel search. The image display apparatus may obtain the channel search condition by performing the channel search condition setting operation, and may the second channel search based on the obtained channel search condition.

When the channel search condition is set, the image display apparatus 100 performs the second channel search for searching for a valid channel based on the set channel search condition as a background operation in operation S450 in parallel while performing the second operations among the initial setting operations, in operation S440. The second operations are to be performed after the channel search operation. For example, the image display apparatus 100 may determine whether a frequency satisfying the set channel search condition among frequencies extracted as the valid frequencies in the first channel search includes a valid broadcast signal that may be received by the image display apparatus 100. For example, when the image display apparatus 100 is set to perform channel search for cable broadcasting in the channel search operation, the image display apparatus 100 may determine whether frequencies corresponding to cable broadcasting among the valid frequencies extracted in the first channel search include a valid broadcast signal that may be received by the image display apparatus 100.

The image display apparatus 100 determines a channel corresponding to a frequency including a valid broadcast signal as a valid channel.

The image display apparatus 100 may determine whether a frequency which satisfies the set channel search condition among frequencies that are not searched in the first channel search corresponds to a channel that may be received by the image display apparatus 100. For example, when the first channel search is terminated without the first channel search for the terrestrial broadcast signal in operation S420 of performing the first channel search, and channel search is set to be performed for the terrestrial broadcast signal in operation S430 of setting the channel search condition, then the image display apparatus 100 determines whether frequencies corresponding to terrestrial broadcasting include a valid broadcast signal that may be received by the image display apparatus 100.

Meanwhile, the image display apparatus 100 according to an embodiment may perform the first channel search and the second channel search in an order of, but not limited to, a cable broadcast signal and a terrestrial broadcast signal.

In operation S480, the image display apparatus 100 according to an embodiment displays a result of the second channel search upon completion of both the initial setting operations and the second channel search S460. For example, the image display apparatus 100 may display a message indicating completion of channel search S460, a list regarding the number of searched channels, and so forth.

When the second channel search is not completed after completion of the initial setting operations (S460:N), the image display apparatus 100 displays a screen indicating a progress state of the second channel search in operation S470. For example, the image display apparatus 100 may display a message indicating ongoing channel search, a graph showing a progress state of the channel search, a list regarding the number of searched channels, and so forth. The image display apparatus 100 may also display a stop button for stopping the channel search. The image display apparatus 100 may also display a result of the second channel search upon completion of the second channel search.

The image display apparatus 100 may generate a channel map including the searched valid channels and stores the generated channel map.

Figure 5:
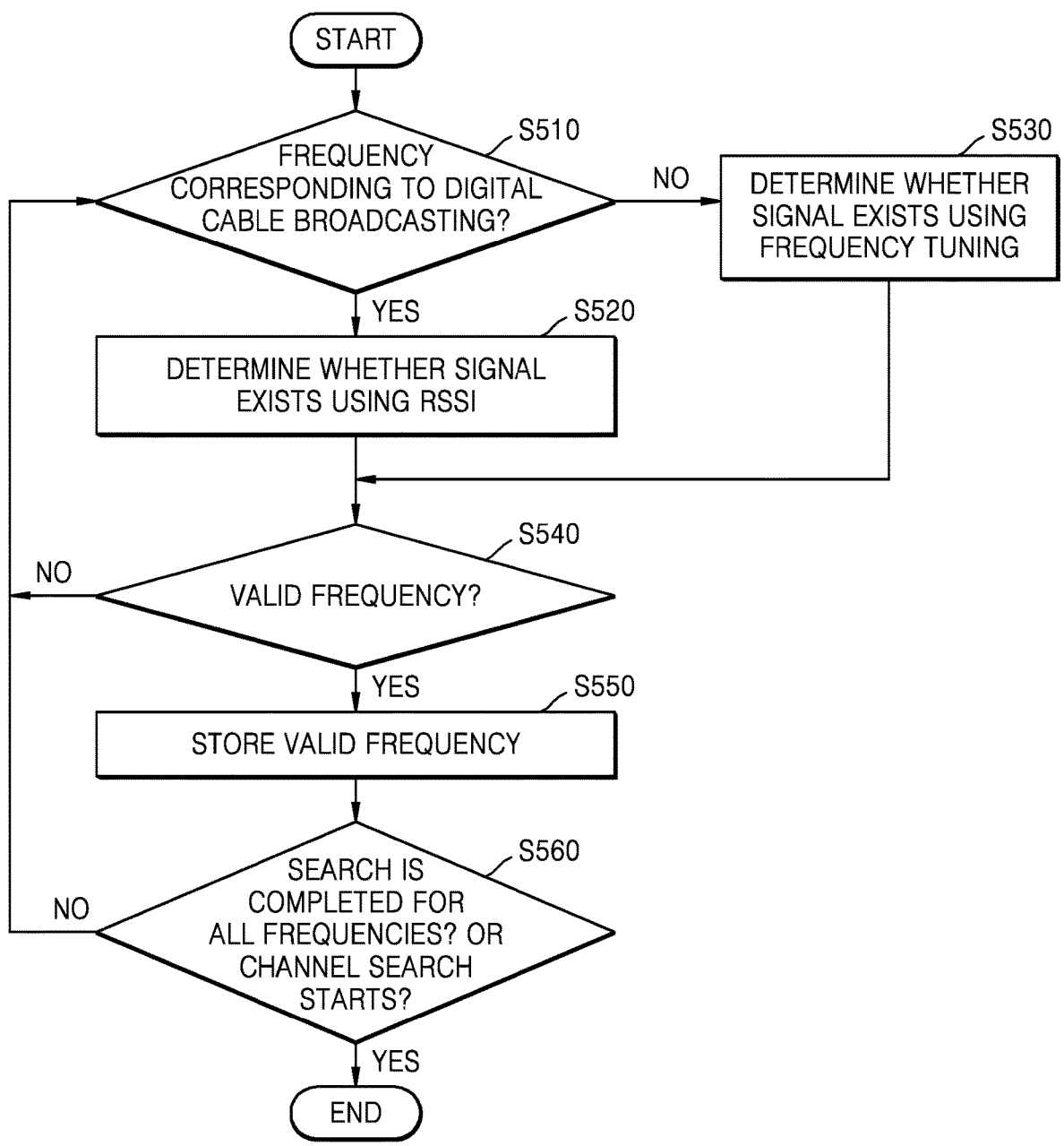
FIG. 5 is a flowchart illustrating an example first channel search method according to an embodiment.

FIG. 5 is a flowchart illustrating an example first channel search method according to an embodiment.

Referring to FIG. 5, the image display apparatus 100 performs the first channel search which includes extracting frequencies (valid frequencies) at which a signal actually exists by determining whether a signal corresponding to frequencies available in a region exists based on the region information set in the image display apparatus 100.

The image display apparatus 100 according to an embodiment determines whether a frequency for which existence or absence of a signal is to be determined is a frequency corresponding to digital cable broadcasting in operation S510, and determines whether the signal corresponding to the frequency exists using an RSSI as a reference value in operation S520 when the frequency is the frequency corresponding to digital cable broadcasting. For example, the RSSI of the frequency is greater than a preset threshold value, the image display apparatus 100 may determine that the signal exists actually.

On the other hand, when the frequency for which whether the signal exists is to be determined is not the frequency corresponding to digital cable broadcasting, the image display apparatus 100 determines whether the signal corresponding to the frequency exists through frequency tuning in operation S530. For example, when the frequency corresponds to any one of analog cable broadcasting, digital terrestrial broadcasting, and analog terrestrial broadcasting, the tuner detects a signal strength by performing frequency tuning using a particular modulation scheme and determines whether the signal exists based on the signal strength.

The image display apparatus 100 extracts the frequency at which the signal exists as a valid frequency S540 and stores an extracted valid frequency band in operation S550.

When the channel search operation does not start, the image display apparatus 100 performs the first channel search for a frequency for which the first channel search is not performed among all the frequencies available in the image display apparatus 100.

On the other hand, the image display apparatus 100 terminates the first channel search when the first channel search is completed or the channel search among the initial setting operations starts for all the frequencies in operation S560.

For example, when the first channel search is performed for only a cable broadcast signal between the cable broadcast signal and a terrestrial broadcast signal when the channel search operation starts, then the image display apparatus 100 may terminate the first channel search without performing the first channel search for the terrestrial broadcast signal.

Figure 6:
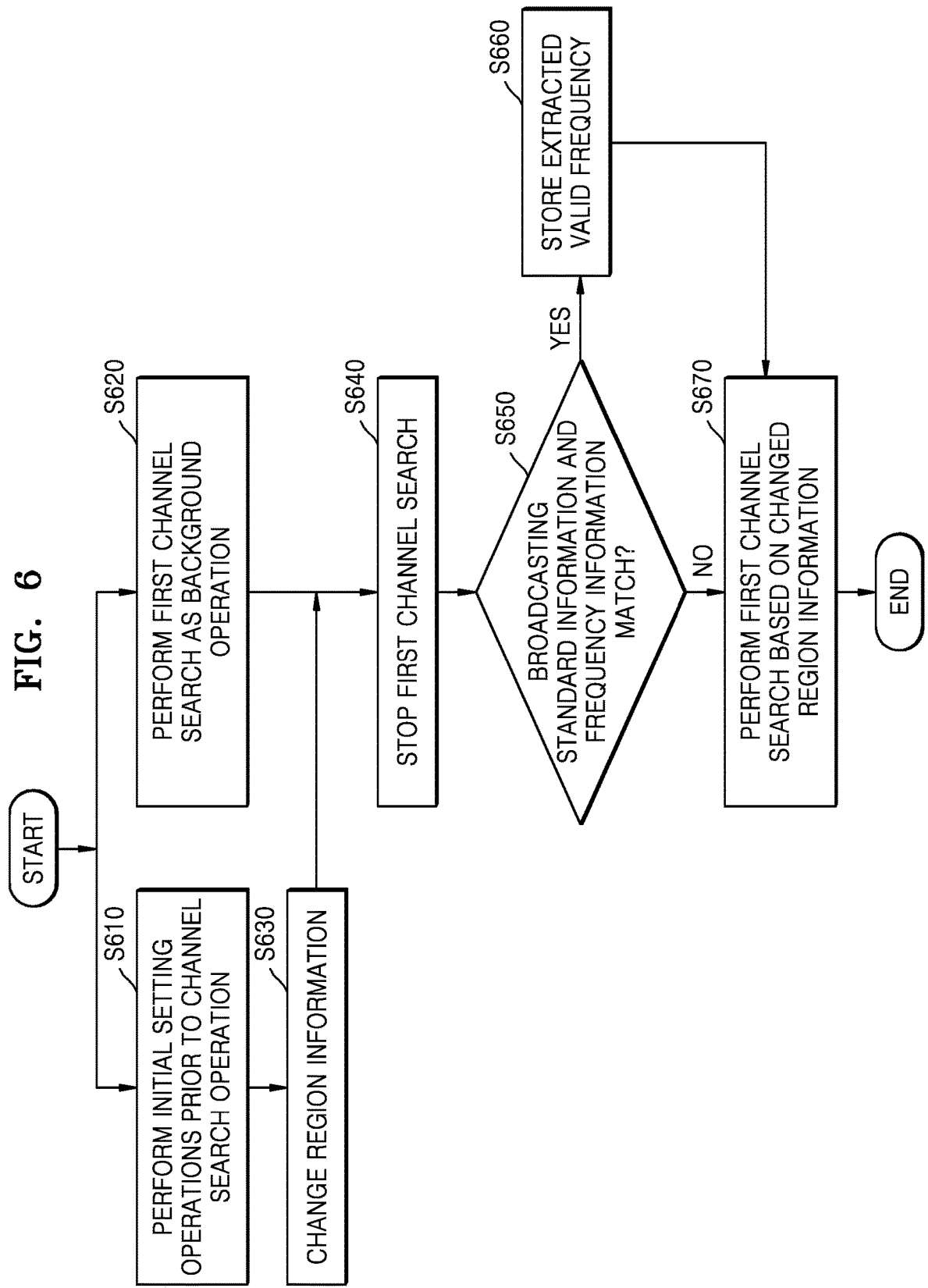
FIG. 6 is a flowchart illustrating an example method of operating an image display apparatus, according to an embodiment.

FIG. 6 is a flowchart illustrating an example method of operating an image display apparatus, according to an embodiment.

Referring to FIG. 6, the image display apparatus 100 according to an embodiment performs operations needed for initial setting of the image display apparatus 100 when the image display apparatus 100 operates initially S610. The image display apparatus 100 performs the initial setting operations in the preset order when initial setting starts.

The image display apparatus 100 according to an embodiment performs the first channel search for extracting a valid frequency as a background operation in operation S620 in parallel while performing the first operations, performed prior to the channel search operation, among the initial setting operations, in operation S610.

According to an embodiment, when the image display apparatus 100 performs the first channel search, region information set in the image display apparatus 100 is changed in operation S630. For example, among the initial setting operations, in the region information setting operation, local information, country information, and so forth, but not limited thereto, may be changed. Once the region information of the image display apparatus 100 is changed, information about a frequency available in the image display apparatus 100 may be changed based on the changed region information.

When the region information of the image display apparatus 100 is changed, the image display apparatus 100 stops the first channel search in operation S640. The image display apparatus 100 determines based on broadcasting standard information and frequency information of the changed region and a previous region whether to store valid frequencies extracted before the stop of the first channel search S650.

The image display apparatus 100 stores the extracted valid frequencies within a range in which the broadcasting standard information and the frequency information of the changed region match those of the previous region, in operation S660. For example, when a region set in the image display apparatus 100 is changed from a first region to a second region, broadcasting standard schemes of the first region and the second region are Advanced Television Systems Committee (ATSC) schemes, and a first valid frequency extracted based on the first region falls within a frequency range set in the second region, the image display apparatus 100 may store the first valid frequency. On the other hand, when a second valid frequency extracted based on the first region does not fall within the frequency range set in the second region, the image display apparatus 100 may not store the second valid frequency. The image display apparatus 100 performs the first channel search again for a frequency for which the first channel search is not performed among all the frequencies available in the second region.

When the broadcasting standard schemes of the changed region and the previous region do not match each other, the image display apparatus 100 performs the first channel search based on the changed region information in operation S670. For example, when the broadcasting standard scheme of the first region is a digital video broadcasting (DVB) scheme and the broadcasting standard scheme of the second region is the ATSC scheme, the image display apparatus 100 may perform the first channel search again within the entire frequency band based on the second region, without storing valid frequencies extracted based on the first region.

FIGS. 7, 8, 9, 10 and 11 are diagrams illustrating an example channel search method of an image display apparatus, according to an embodiment.

Figure 7:
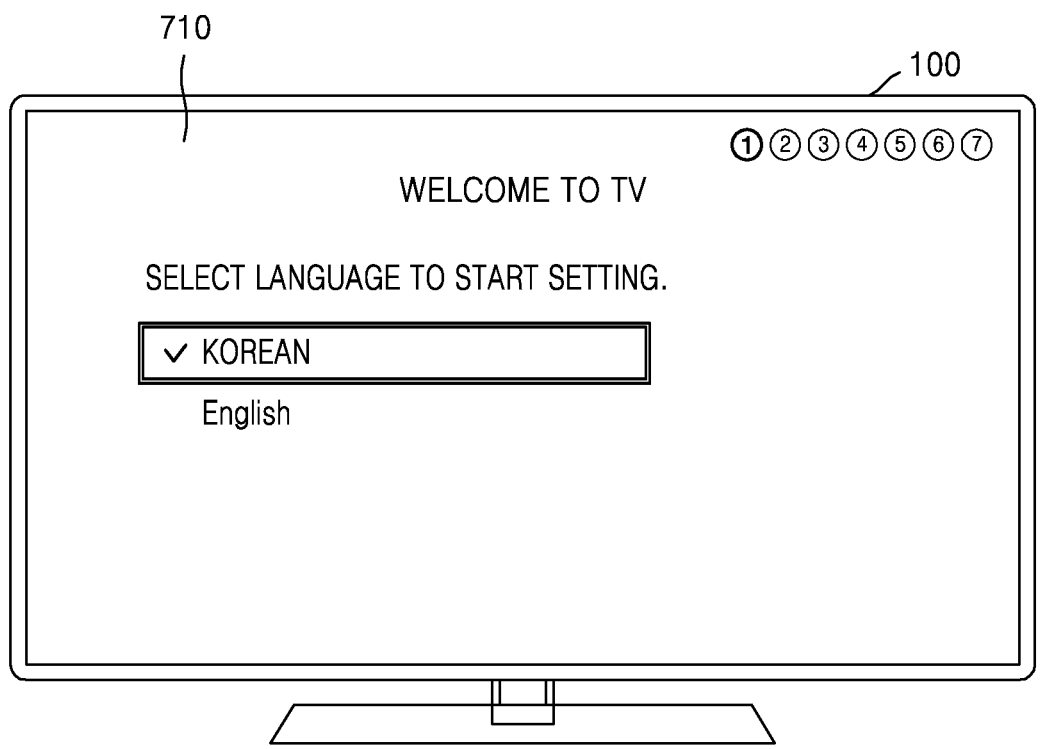
FIGS. 7, 8, 9, 10 and 11 are diagrams illustrating an example channel search method of an image display apparatus, according to an embodiment.

The image display apparatus 100 according to an embodiment performs operations needed for initial setting of the image display apparatus 100 when the image display apparatus 100 operates initially. The initial setting operations may include, but not limited to, at least one of a language setting operation, a region information setting operation, a channel search operation, and a network setting operation, and may be performed in a preset order. For example, the initial setting of the image display apparatus 100 according to an embodiment may include seven stages, in each of which an operation needed for initial setting may be performed. As illustrated in FIG. 7, on a screen, numbers (for example, 1 to 7) indicating the stages included in initial setting may be displayed and a number of a stage corresponding to an ongoing operation may be highlighted.

For example, the image display apparatus 100 may perform a language setting operation in a first stage of the initial setting, and as illustrated in FIG. 7, the image display apparatus 100 may display a language setting screen 710. However, the present disclosure is not limited to this example.

Once the initial setting starts, the image display apparatus 100 performs the first channel search for extracting a valid frequency as a background operation in parallel with the initial setting operations. For example, the image display apparatus 100 may determine whether a signal exists for frequencies corresponding to region information set in the image display apparatus 100 as a background operation, simultaneously with the language setting operation, and extract a frequency at which a signal actually exists as a valid frequency.

When the channel search operation among the initial setting operations starts, the image display apparatus 100 may terminate the first channel search for all the frequencies set in the image display apparatus 100, even if the first channel search is not completed.

Figure 8:
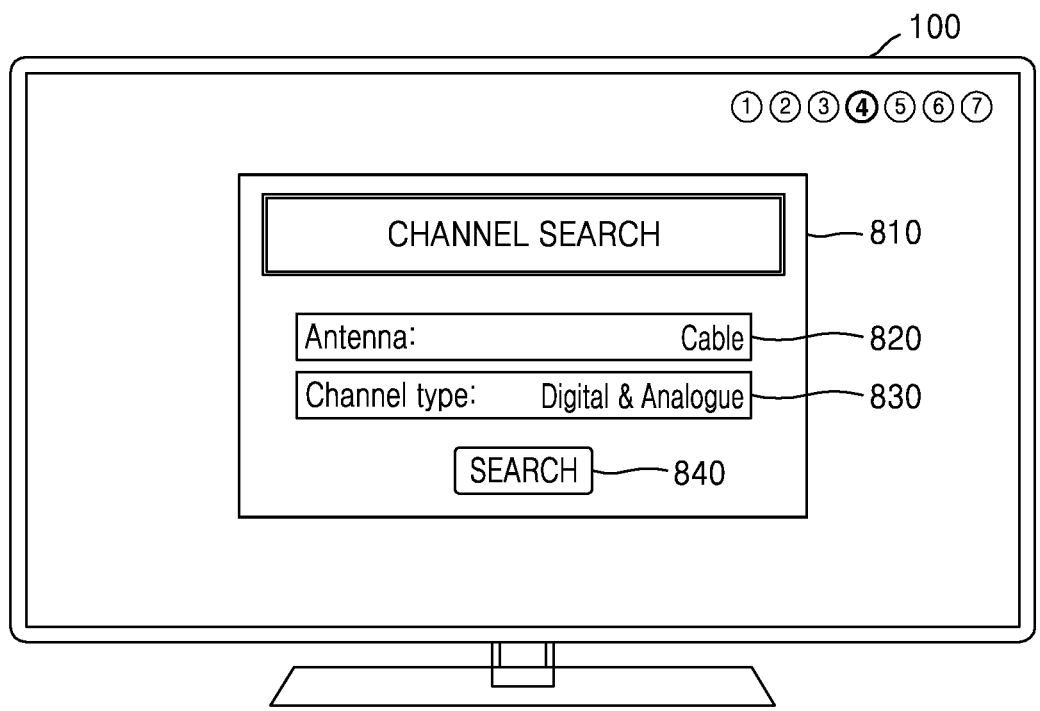

Referring to FIG. 8, the image display apparatus 100 displays a channel search condition setting screen 810 once the channel search operation is performed. The operation for setting the channel search condition to obtain the channel search condition may be referred to as a channel search condition setting operation. The channel search condition may be preset or may be set based on a user input. For example, on the channel search condition setting screen 810, menu items for setting a type of a broadcast signal and a channel type may be displayed. More specifically, a menu item 820 for setting at least one of cable broadcasting, terrestrial broadcasting, and satellite broadcasting and a menu item 830 for setting at least one of digital broadcasting and analog broadcasting may be included in the menu items. However, the present disclosure is not limited to this example.

The image display apparatus 100 searches for a channel based on a set condition. For example, upon reception of a user input to set a type of a broadcast signal to cable broadcasting and a channel type to digital and analog and to select a search button 840 as illustrated in FIG. 8, the image display apparatus 100 performs the second channel search including searching for a channel that may be received for frequencies corresponding to digital cable broadcasting and analog cable broadcasting. The image display apparatus 100 may also perform the second channel search within a range of valid frequencies extracted in the first channel search. The searching for a channel that may be received may be performed as a background operation in parallel with the initial setting operations to be performed after the channel search operation.

Figure 9:
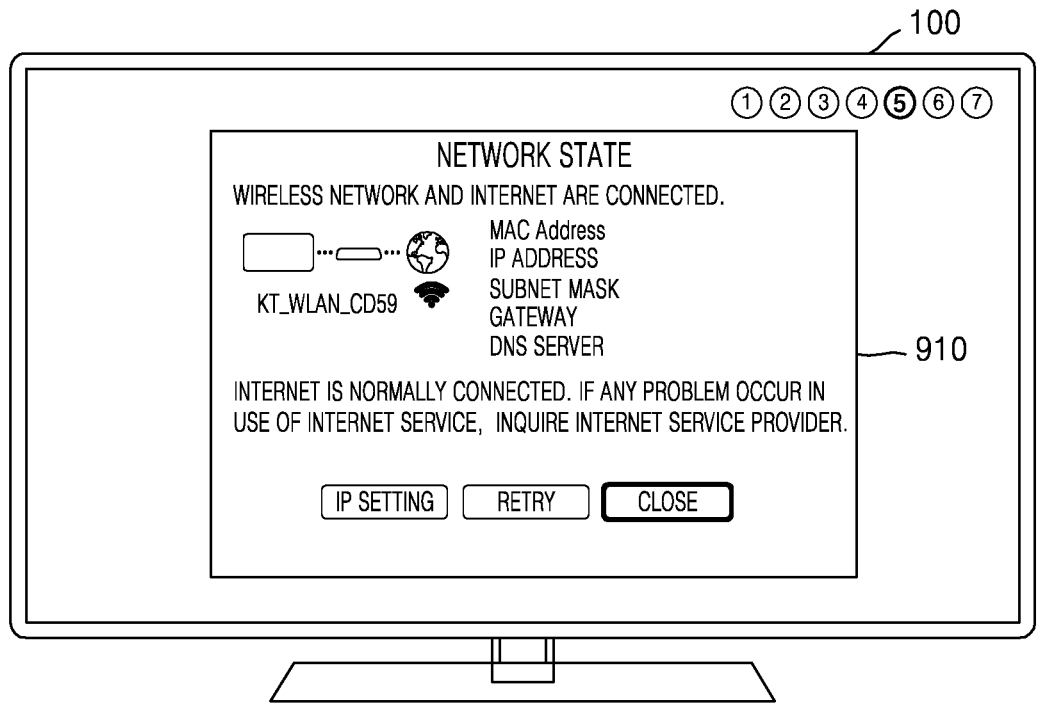

For example, as illustrated in FIG. 9, once the channel search condition is set, as the network setting operation following the channel search operation is performed, the second channel search is performed as a background operation. During the network setting operation, the image display apparatus 100 may display a network setting screen 910 without displaying a screen showing a progress state of the second channel search.

Figure 10:
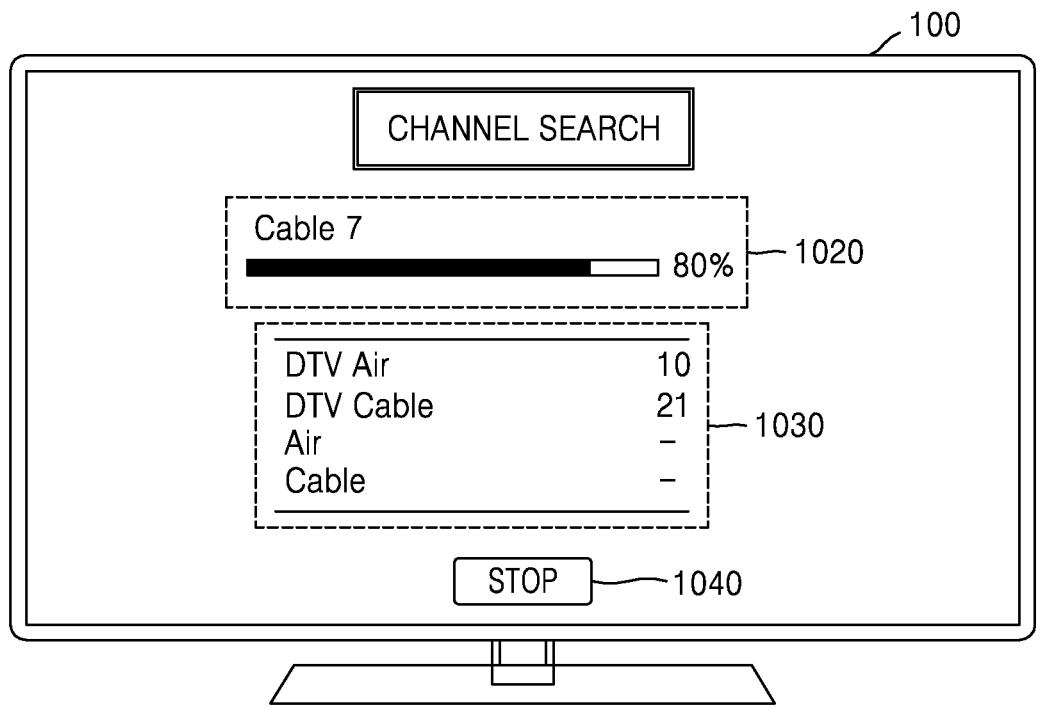

The image display apparatus 100 may display a screen indicating a progress state of the second channel search as illustrated in FIG. 10, when the second channel search is not completed in spite of completion of the initial setting operations.

For example, at least one of a graph 1020 showing a progress state of channel search and a list 1030 regarding the number of currently searched channels may be displayed. The image display apparatus 100 may also display a stop button 1040 for stopping the channel search.

Figure 11:
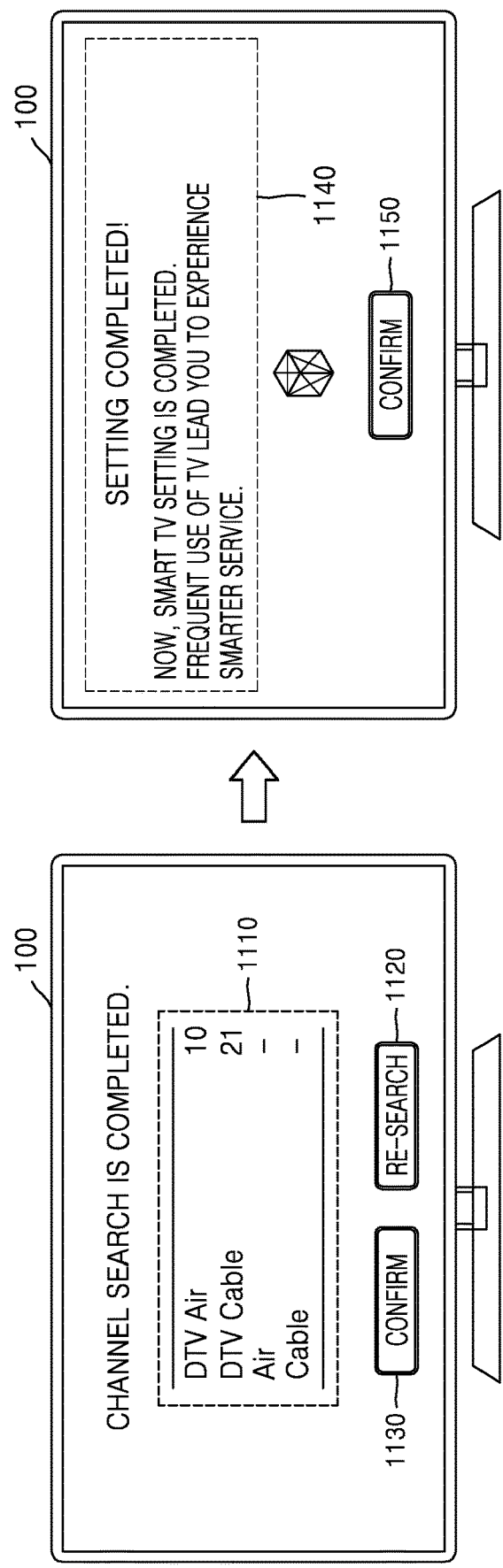

On the other hand, upon completion of the second channel search, the image display apparatus 100 may display a result of the second channel search as illustrated in FIG. 11. For example, the image display apparatus 100 may display a message indicating completion of channel search and a list 1110 regarding the number of searched channels.

The image display apparatus 100 may also display a re-search button 1120. When the image display apparatus 100 senses a user input to select the re-search button 1120, the image display apparatus 100 performs channel search again. The image display apparatus 100 may also display a confirm button 1130. When the image display apparatus 100 senses a user input to select the confirm button 1130, the image display apparatus 100 generates a channel map including a searched channel. However, the present disclosure is not limited to this example.

The image display apparatus 100 also displays a setting complete message 1140 regarding the initial setting operations and a confirm button 1150, as illustrated in FIG. 11. When the image display apparatus 100 senses a user input to select the confirm button 1150, the image display apparatus 100 terminates initial setting.

By performing the first channel search and the second channel search simultaneously and in parallel with the initial setting operations, the image display apparatus according to an embodiment may reduce a time needed for completion of the initial setting operations and may perform other initial setting operations without waiting on the channel search screen until completion of the channel search.

The image display apparatus according to an embodiment extracts valid frequencies before setting the channel search condition, such that the image display apparatus searches for only the extracted valid frequencies when the image display apparatus performs actual channel search satisfying the set channel search condition, thereby reducing a time needed for channel search.

The operation method of the image display apparatus according to an embodiment may be implemented in the form of program commands that can be executed through various computer components and recorded in a computer-readable recording medium. The computer-readable recording medium may include a program command, a data file, a data structure and the like solely or in a combined manner. The program command recorded in the computer-readable recording medium may be a program command specially designed and configured for the present embodiments or a program command known to be used by those skilled in the art of the computer software field. Examples of the computer-readable recording medium may include magnetic media such as hard disk, floppy disk, and magnetic tape, optical media such as compact disk read only memory (CD-ROM) and digital versatile disk (DVD), magneto-optical media such as floptical disk, and a hardware device especially configured to store and execute a program command, such as read only memory (ROM), random access memory (RAM) and flash memory, etc. Further, examples of the program commands include a machine language code created by a complier and a high-level language code executable by a computer using an interpreter.

While the present disclosure has been illustrated and described with reference to various example embodiments thereof, the scope of the present disclosure is not limited to the description and also includes various modifications and improvements made by those of ordinary skill in the art using the concept of the present disclosure defined in the appended claims.

It should be understood that the example embodiments described herein should be considered in a descriptive sense only and not for purposes of limitation. Descriptions of features or aspects within each embodiment should typically be considered as available for other similar features or aspects in other embodiments.

While various example embodiments have been described with reference to the figures, it will be understood by those of ordinary skill in the art that various changes in form and details may be made therein without departing from the spirit and scope as defined by the following claims.

What is claimed is:

1. An image display apparatus comprising:
a display;
a memory storing one or more instructions; and
a processor configured to execute the one or more instructions stored in the memory,
wherein the instructions, when executed by the processor, are configured to cause the image display apparatus to:
perform a first channel search operation for identifying one or more valid frequency bands from among a plurality of frequency bands as a background operation, while at least one of initial setting operations of the image display apparatus is performed,
in response to a user input being received through at least one of initial setting operations of the image display apparatus, perform a second channel search operation for identifying at least one valid channel via which a broadcasting signal is receivable using the valid frequency bands identified through the first channel search operation, and
display a result of the second channel search operation on the display.

2. The image display apparatus of claim 1, wherein the one or more instructions, when executed by the processor cause the image display apparatus to identify the one or more valid frequency bands in which a signal exists from among the plurality of frequency bands corresponding to region information set in the image display apparatus.

3. The image display apparatus of claim 2, wherein the image display apparatus is configured to, while performing the first channel search operation for a cable digital broadcasting, identify one or more valid frequency bands for a cable digital broadcasting based on a received signal strength indication (RSSI) as a reference value for a plurality of frequency bands corresponding to the cable digital broadcasting.

4. The image display apparatus of claim 2, wherein the one or more instructions, when executed by the processor, cause the image display apparatus to determine whether to use the frequency bands identified by the first channel search operation prior to a change of the region information for the second channel search operation based on broadcasting standard information and frequency information of a changed region and a region previous to the change, when the region information is changed during the first channel search operation.

5. The image display apparatus of claim 2, wherein the one or more instructions, when executed by the processor, cause the image display apparatus to identify one or more valid frequency bands in which the signal exists from among a plurality of frequency bands corresponding to a changed region, when the region information is changed during the first channel search operation.

6. The image display apparatus of claim 1, wherein the one or more instructions, when executed by the processor cause the image display apparatus to identify the at least one valid channel via which a broadcasting signal is receivable by the image display apparatus while simultaneously performing remaining initial setting operations among the initial setting operations.

7. The image display apparatus of claim 6, wherein the one or more instructions, when executed by the processor, cause the image display apparatus to terminate the first channel search operation when the second channel search operation starts, and to perform the second channel search operation by using the one or more valid frequency bands identified by the first channel search operation.

8. The image display apparatus of claim 7, wherein the one or more instructions, when executed by the processor, cause the image display apparatus to perform a third channel search operation for identifying one or more valid channels from among channels for which the first channel search operation is not performed, based on a channel search condition, while simultaneously performing the remaining initial setting operations.

9. The image display apparatus of claim 1, wherein the one or more instructions, when executed by the processor, cause the image display apparatus to display a result of the second channel search operation on the display after completion of the initial setting operations.

10. The image display apparatus of claim 1, wherein the user input comprises a channel search condition obtained by performing a channel search condition setting operation to obtain the channel search condition.

11. The image display apparatus of claim 1, wherein the initial setting operations include at least one of: a language setting operation, a network setting operation, and a region information setting operation.

12. A method of operating an image display apparatus, the method comprising:
performing a first channel search operation for identifying one or more valid frequency bands from among a plurality of frequency bands as a background operation, while at least one of initial setting operations of the image display apparatus is performed,
in response to a user input being received through at least one of initial setting operations of the image display apparatus, performing a second channel search operation for identifying at least one valid channel via which a broadcasting signal is receivable using the valid frequency bands identified through the first channel search operation, and
displaying a result of the second channel search operation on the display.

13. The method of claim 12, wherein the performing of the first channel search as the background operation comprises identifying the one or more valid frequency bands in which a signal exists from among the plurality of frequency bands corresponding to region information set in the image display apparatus.

14. The method of claim 13, wherein the performing of the first channel search as the background operation comprises identifying the one or more valid frequency bands for a cable digital broadcasting based on a received signal strength indication (RSSI) as a reference value for a plurality of frequency bands corresponding to the cable digital broadcasting.

15. The method of claim 13, further comprising determining whether to use the frequency bands identified by the first channel search operation prior to a change of the region information for the second channel search operation based on broadcasting standard information and frequency information of a changed region and a region previous to the change, when the region information is changed during the first channel search operation.

16. The method of claim 13, wherein the performing of the first channel search as the background operation comprises identifying one or more valid frequency bands in which the signal exists from among a plurality of frequency bands corresponding to a changed region, when the region information is changed during the first channel search operation.

17. The method of claim 12, wherein the performing of the second channel search comprises identifying the at least one valid channel via which a broadcasting signal is receivable by the image display apparatus while simultaneously performing remaining initial setting operations among the initial setting operations.

18. The method of claim 17, further comprising terminating the first channel search operation when the second channel search operation starts, and performing the second channel search operation by using the one or more valid frequency bands identified by the first channel search operation.

19. The method of claim 18, further comprising performing a third channel search operation for identifying one or more valid channels from among channels for which the first channel search operation is not performed, based on a channel search condition, while simultaneously performing the remaining initial setting operations.

20. A non-transitory computer-readable recording medium having recorded thereon a program which when executed by a processor causes an image display device to perform at least the operations of claim 12.

* * * * *